United States Patent
Xi et al.

(10) Patent No.: US 9,457,388 B2
(45) Date of Patent: Oct. 4, 2016

(54) DOUBLE-LAYER PERSULFATE SUSTAINED-RELEASE MATERIAL AND ITS PREPARATION METHOD

(71) Applicant: Chinese Research Academy of Environmental Sciences, Beijing (CN)

(72) Inventors: Beidou Xi, Beijing (CN); Yonghai Jiang, Beijing (CN); Yu Yang, Beijing (CN); Mingxiao Li, Beijing (CN); Zhifei Ma, Beijing (CN); Lieyu Zhang, Beijing (CN); Min Li, Beijing (CN); Fangyi Chen, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 174 days.

(21) Appl. No.: 14/334,879

(22) Filed: Jul. 18, 2014

(65) Prior Publication Data
US 2015/0021251 A1 Jan. 22, 2015

(30) Foreign Application Priority Data
Jul. 18, 2013 (CN) .......................... 2013 1 0303658

(51) Int. Cl.
| | |
|---|---|
| B09C 1/00 | (2006.01) |
| B29C 39/02 | (2006.01) |
| B29C 39/10 | (2006.01) |
| C02F 1/72 | (2006.01) |
| B28B 1/00 | (2006.01) |
| B28B 7/00 | (2006.01) |
| B28B 23/00 | (2006.01) |
| C02F 103/06 | (2006.01) |

(52) U.S. Cl.
CPC ............... *B09C 1/002* (2013.01); *B28B 1/008* (2013.01); *B28B 7/0091* (2013.01); *B28B 23/0068* (2013.01); *C02F 1/722* (2013.01); *C02F 2103/06* (2013.01); *C02F 2305/023* (2013.01)

(58) Field of Classification Search
None
See application file for complete search history.

(56) References Cited

U.S. PATENT DOCUMENTS

| | | | | |
|---|---|---|---|---|
| 2,948,699 | A * | 8/1960 | William | C04B 24/2652 524/650 |
| 3,580,879 | A * | 5/1971 | Higashimura et al. | C04B 24/2641 166/295 |
| 3,591,542 | A * | 7/1971 | Bonnel et al. | C04B 28/02 166/293 |
| 3,652,305 | A * | 3/1972 | Cook | C04B 33/13 106/801 |
| 3,692,728 | A * | 9/1972 | Bonnel | C04B 24/30 106/696 |
| 4,436,555 | A * | 3/1984 | Sugama | C03C 3/16 106/690 |
| 2002/0108535 | A1 * | 8/2002 | Nguyen | E21B 43/08 106/719 |

\* cited by examiner

*Primary Examiner* — Joseph D Anthony
(74) *Attorney, Agent, or Firm* — Hamre, Schumann, Mueller & Larson, P.C.

(57) ABSTRACT

The present invention involves a persulfate-release material used in the filler of permeable reactive barrier (PRB). This material presents double-layered structure characteristic: inner- and outer-layers are consisted of persulfate, cement, sand and water with different mass ratio. Two different types of moulds are used for the regulation of the shape of the two-layer structures, which guarantees the stability and reproducibility of its structures and properties. During the whole released process, the released rate become more uniform and stable by the use of this material. During the whole service period, the change of the released rate is very slow, and the service lifetime can be 1-10 years. This invention can both reduce the initial released rate and improve the later released rate, and thus the whole released rate can be more uniform, which can be an important method to promote the efficiency of the persulfate toward engineering application.

1 Claim, 1 Drawing Sheet

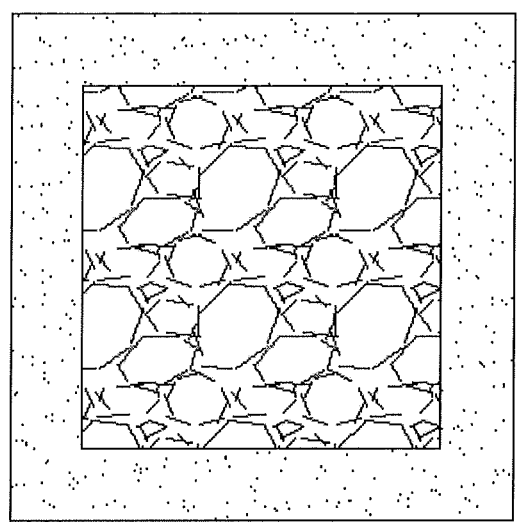

DOUBLE-LAYER PERSULFATE SUSTAINED-RELEASE MATERIAL AND ITS PREPARATION METHOD

FIELD OF THE INVENTION

The present invention belongs to the field of remediation of pollutant in groundwater, and particularly involves a persulfate-release material used in the filler of permeable reactive barrier and its preparation method.

BACKGROUND OF THE INVENTION

In recent years, permeable reactive barrier (PRB) is a fast-growing technology used in the in-situ remediation of pollutant in groundwater. It has been widely used, and been gradually regarded as the mainstream technology in this field. Up to now, more than 120 PRB have been settled up in North American and Europe. Currently, the use of high-level oxidants as the filler of PRB for the remediation of pollutant in groundwater has been the spot-light in the PRB field. Among these oxidants, persulfate has been largely used in the removal of refractory organic compounds, and gradually been the hotspot in the in-situ chemical remediation of pollutant, because the persulfate has several advantages as follows: 1. low-cost persulfate can product the sulfate radical (standard oxidation-reduction potential: $E_0$=+2.5~+3.1V) with strong oxidizing property, under the condition of transition metal catalyst; 2. persulfate presents high oxidization ability in acidic, neutral, and alkaline conditions.

Persulfate with the concentration of ca. 200 mg/L usually presents good degradation effect for the pollutant dyes (such as 2,4-DNT, MTBE) with the concentration of 10 mg/L. However, the solubility of the persulfate in water is in the range 5.3-54.9 g/100 mL, and thus the use of persulfate directly as the filler of PRB can result in the waste of oxidant and secondary pollution of groundwater, and this also cannot maintain long-time degradation effect. Therefore, it is necessary to develop new method to achieve the sustained release of the persulfate toward their high-effective and long-time utilization.

Currently, the most common preparation method of sustained-release materials is mixing the persulfate and adhesive material into bulk substance, in which the persulfate can be distributed uniformly. However, when these persulfate-based sustained-release materials were immersed into water, the released rate is high initially, and then gradually stable, which will be very low during a long time. Therefore, how to achieve the long-time and stable release of the persulfate plays a key role in the design these materials.

SUMMARY OF THE INVENTION

To solve problems above, this innovation put forward a double-layer persulfate sustained-release material as filler medium in PRB and its preparation method towards the remediation of pollutant. This material presents double-layer structure characteristic: inner- and outer-layers are consisted of persulfate, cement, sand and water with different mass ratio. By changing their mass ratio, the permeability can be controlled. This can further lower the initial released rate, and improve the supplement of the persulfate at the later stage.

The technology scheme is as follows: by mixing the persulfate, cement, sand and water with different mass ratio to prepare the internal and external materials; then, the inner- and outer-layer structures will be fixed using two types of moulds. The as-obtained double-layer persulfate sustained-release material can obviously reduce the dissolution rate of persulfate, prolong the service lifetime of PRB, and maintain a stable released rate during a long time.

The double-layer persulfate sustained-release material in this innovation includes internal and external structures, and the thickness ratio between internal and external layers is in the range of (1-4):1; the permeability of the internal material is higher than that of the external one, and the permeability coefficient of inner-layer material is 5-200 times as high as that of the outer-layer material.

The as-described double-layer persulfate sustained-release material is cube with the side length of 2-10 cm.

The described inner-layer material is obtained by mixing persulfate, cement, sand and water uniformly with the mass ratio in the range of 1:(0.6-1):(1.5-2.5):(0.5-1). The described outer-layer material is obtained by mixing persulfate, cement, sand and water uniformly with the mass ratio in the range of 1:(2-3):(1.2-1.5):(0.8-1.2).

The described double-layer persulfate sustained-release material is prepared by the combination of two moulds to fix the shape, i.e., two types of moulds are used to fix the internal and external structures. The detailed procedure is as follows:

(1) preparing inner-layer material: mixing persulfate, cement, sand and water uniformly with the mass ratio of 1:(0.6-1):(1.5-2.5):(0.5-1);

(2) filling the inner-layer material prepared in step (1) into the inner-layer mould; after the shape was fixed, and the inner-layer mould is removed. The inner-layer cubic structure with the side length of 1-8 cm can be obtained;

(3) preparing outer-layer material: mixing persulfate, cement, sand and water uniformly with the mass ratio of 1:(2-3):(1.2-1.5):(0.8-1.2);

(4) embedding the inner-layer structure into the centre of outer-layer mould, which will be filled by the outer-layer material prepared in step (3). i.e., the outer-layer material can wrap at the out surface of the inner-layer structure. The obtained structure is cube with the side length of 2-10 cm, which will be further solidified for 1-2 days. Then, the double-layer persulfate sustained-release material can be obtained.

The double-layer persulfate sustained-release material can be used as the filler of PRB.

By immersion of the double-layer persulfate sustained-release material into standard immersion environment (2 L of ultrapure water; 10° C.) for 1-2 days, the stable released rate can be achieved. The released rate is 0.5-250 mg/d. During the whole service period, the change of the released rate is very slow, and the service lifetime can be 1-10 years.

On the basis of the deep investigation of the solidification and sustained release rule and mechanism, this innovation has put forward that the solidification and sustained release of the persulfate can be achieved by the combined use of cement, sand and water, which is benefit to the extension of the service period of the PRB with the persulfate as the active material. Considering that the single-layer persulfate sustained-release material presents high released rate initially as well as unstable and low released rate at the later stage, this innovation also raises the preparation scheme of a double-layer structure. By tuning the ratio of the components in both internal and external layers, the permeability and released rate can be controlled. The composition of material is the same, but the difference in the ratio can result in the permeability is reduced from inside to outside, which can balance the released rate of the persulfate effectively. Therefore, the persulfate sustained-release material presents stable released ability and degradation effect, which can be benefit to the further engineering application. Moreover, the two different types of moulds are used for the regulation of the shape of the two-layer structures, which guarantees the stability and reproducibility of its structures and properties.

By the use of double-layer persulfate sustained-release material described in this innovation for the remediation of groundwater, the released rate of the persulfate and the sulfate radical can be controlled in the PRB, which can further control and reduce the concentration of the sulfate radical in the groundwater, and thus avoid the loss of the excessive persulfate and sulfate radical. In addition, this material presents relative stable released rate during the whole service period, and maintains stability of the degradation property. Moreover, this material can both reduce the initial released rate and improve the later released rate, and thus the whole released rate can be more uniform. Under the same content of persulfate, the released period can be further improved, and the waste induced by the initial fast release can be avoided. These advantages largely improve the practical value of the persulfate material. Therefore, this material can not only prolong the lifetime of the PRB, but also maintain the long-time and high-efficient operation during the remediation process.

The raw stock of the double-layer persulfate sustained-release material is easily available, and the obtained material presents safe and environmentally-friendly as well as good sustained-release effect. The materials used in PRB technology can prolong the service lifetime for 1-10 years. Moreover, this system cannot result in the secondary pollution, accompanied by the high-efficient degradation of the water pollutants during a long time.

BRIEF DESCRIPTION OF THE DRAWINGS

FIG. 1: the schematic profile of the double-layer persulfate sustained-release material in this innovation.

DETAILED DESCRIPTION OF THE EMBODIMENTS

The present invention will be further explained through following examples:

Example 1

(1) preparing the inner-layer material: mixing persulfate, cement, sand and water uniformly with the mass ratio of 1:1:2:1;

(2) filling the inner-layer material prepared in step (1) into the inner-layer mould; after the shape was fixed, and the inner-layer mould can be removed. The inner-layer cubic structure with the side length of 6 cm can be obtained;

(3) preparing the outer-layer material: mixing persulfate, cement, sand and water uniformly with the mass ratio of 1:2:1.2:0.8.

(4) embedding the inner-layer structure into the centre of outer-layer mould, which will be filled by the outer-layer material prepared in step (3). With the aid of the outer-layer mould, outer-layer material (2 cm) can be wrapped at the out surface of the inner-layer structure. The obtained structure is cube with the side length of 10 cm, which will be further solidified for 1 day. Then, the double-layer persulfate sustained-release material can be obtained.

The double-layer persulfate sustained-release material can be used as the filler of PRB.

By immersion of the above double-layer persulfate sustained-release material into 2 L of ultrapure water at 10° C., the released rate is relative higher for the first day, gradually decrease for the second day, and is stable until the third day (210±3 mg/d). After that, the released rate is highly stable with the change rate of 0.5 mg/d$^2$, and continuous released time can be predicted for 1.9 years.

Therefore, the above double-layer persulfate sustained-release material is suitable to the remediation plan of 1.9 years, and the continuous supplement ability is 210×16/270=12.44 mg/d. If the whole oxygen demand of a certain contaminated zone is 1×10$^5$ mg, and the remediation period is 1.9 years, the rate of the oxygen supplement of the sustained-release material is 1×10$^5$/(1.9×365)=144.2 mg/d. Therefore, the numbers of the above material used in the PRB can be determined as: 144.2/12.44=11.6, i.e, by adding 12 double-layer persulfate sustained-release materials into the PRB, the oxygen supplement ability is 149.28 mg/d, and thus the target zone can be cleaned during 1×10$^5$/(149.28×365)=1.83 years.

Example 2

(1) preparing inner-layer material: mixing persulfate, cement, sand and water uniformly with the mass ratio of 1:1:2:1;

(2) filling the inner-layer material prepared in step (1) into the inner-layer mould; after the shape was fixed, and the inner-layer mould can be removed. The inner-layer cubic structure with the side length of 8 cm can be obtained;

(3) preparing outer-layer material: mixing persulfate, cement, sand and water uniformly with the mass ratio of 1:2:1.2:0.8;

(4) embedding the inner-layer structure into the centre of outer-layer mould, which will be filled by the outer-layer material prepared in step (3). With the aid of the outer-layer mould, outer-layer material (1 cm) can be wrapped at the out surface of the inner-layer structure. The obtained structure is cube with the side length of 10 cm, which will be further solidified for 1 day. Then, the double-layer persulfate sustained-release material can be obtained.

The double-layer persulfate sustained-release material can be used as the filler of PRB.

By immersion of the above double-layer persulfate sustained-release material into 2 L of ultrapure water at 10° C., the released rate is relative higher for the first 10 hours, gradually decrease and is stable until the second day (105±2 mg/d). After that, the released rate is highly stable with the change rate of 0.3 mg/d$^2$, and continuous release time can be predicted as 9 years.

Therefore, the above double-layer persulfate sustained-release material is suitable to the remediation plan of 9 years, and the continuous supplement ability is 105×16/270=6.22 mg/d. if the whole oxygen demand of a certain contaminated zone is 1×10$^5$ mg, and the remediation period is 9 years, the rate of the oxygen supplement of the sustained-release material is 1×10$^5$/(9×365)=30.44 mg/d. Therefore, the numbers of the above material used in the PRB can be determined as: 30.44/6.22=4.89, i.e, by adding 5 double-layer persulfate sustained-release materials into the PRB, the oxygen supplement ability is 31.1 mg/d, and thus the target zone can be cleaned during 1×10$^5$/(31.1×365)=8.8 years.

Example 3

(1) preparing inner-layer material: mixing persulfate, cement, sand and water uniformly with the mass ratio of 1:1:2:1;

(2) filling the inner-layer material prepared in step (1) into the inner-layer mould; after the shape was fixed, and the inner-layer mould can be removed. The inner-layer cubic structure with the side length of 1 cm can be obtained.

(3) preparing outer-layer material: mixing persulfate, cement, sand and water uniformly with the mass ratio of 1:2:1.2:0.8;

(4) embedding the inner-layer structure into the centre of outer-layer mould, which will be filled by the outer-layer material prepared in step (3). With the aid of the outer-layer mould, outer-layer material (0.5 cm) can be wrapped at the out surface of the inner-layer structure. The obtained structure is cube with the side length of 2 cm, which will be further solidified for 1 day. Then, the double-layer persulfate sustained-release material can be obtained.

The double-layer persulfate sustained-release material can be used as the filler of PRB.

By immersion of the above double-layer persulfate sustained-release material into 2 L of ultrapure water at 10° C., the released rate is relative higher for the first 4 hours, gradually decrease and is stable ($2\pm0.05$ mg/d). After that, the released rate is highly stable with the change rate of 0.003 mg/d$^2$, and continuous release time can be predicted as 1 years.

Therefore, the above double-layer persulfate sustained-release material is suitable to the remediation plan of 1 year, and the continuous supplement ability is $2\times16/270=0.1185$ mg/d. if the whole oxygen demand of a certain contaminated zone is $1\times10^5$ mg, and the remediation period is 1 year, the rate of the oxygen supplement of the sustained-release material is $1\times10^5/365=273.97$ mg/d. Therefore, the numbers of the above material used in the PRB can be determined as: $273.97/0.1185=2311.9$, i.e, by adding 2312 double-layer persulfate sustained-release materials into the PRB, the oxygen supplement ability is 273.972 mg/d, and thus the target zone can be cleaned during $1\times10^5/(273.972\times365)=1$ year.

Example 4

(1) preparing inner-layer material: mixing persulfate, cement, sand and water with the mass ratio of 1:0.6:2.5:1 uniformly;

(2) filling the inner-layer material prepared in step (1) into the inner-layer mould; after the shape was fixed, and the inner-layer mould can be removed. The inner-layer cubic structure with the side length of 1 cm can be obtained;

(3) preparing outer-layer material: uniform mixing persulfate, cement, sand and water with the mass ratio of 1:3:1.2:1.2;

(4) embedding the inner-layer structure into the centre of outer-layer mould, which will be filled by the outer-layer material prepared in step (3). With the aid of the outer-layer mould, outer-layer material (0.5 cm) can be wrapped at the out surface of the inner-layer structure. The obtained structure is cube with the side length of 2 cm, which will be further solidified for 1 day. Then, the double-layer persulfate sustained-release material can be obtained.

The double-layer persulfate sustained-release material can be used as the filler of PRB.

By immersion of the above double-layer persulfate sustained-release material into 2 L of ultrapure water at 10° C., the released rate is relative higher for the first day, gradually decrease and is stable until the second day ($1\pm0.03$ mg/d). After that, the released rate is highly stable with the change rate of 0.001 mg/d$^2$, and continuous release time can be predicted for 2 years.

Therefore, the above double-layer persulfate sustained-release material is suitable to the remediation plan of 2 years, and the continuous supplement ability is $1\times16/270=0.0593$ mg/d. if the whole oxygen demand of a certain contaminated zone is $1\times10^5$ mg, and the remediation period is 2 year, the rate of the oxygen supplement of the sustained-release material is $1\times10^5/(2\times365)=136.97$ mg/d. Therefore, the numbers of the above material used in the PRB can be determined as: $136.97/0.0593=2311.6$, i.e, by adding 2312 double-layer persulfate sustained-release materials into the PRB, the oxygen supplement ability is 137.1 mg/d, and thus the target zone can be cleaned during $1\times10^5/(137.1\times365)=1.99$ years.

The invention claimed is:

1. A preparation method for a double-layer persulfate sustained-release, comprising:
   (1) preparing an inner-layer material including mixing persulfate, cement, sand and water uniformly in a mass ratio of 1:(0.6-1):(1.5-2.5):(0.5-1);
   (2) filling the inner-layer material prepared in step (1) into an inner-layer mould and removing the inner-layer mould after the inner-layer material was fixed into an inner-layer structure, wherein the inner-layer structure has a cubic structure with a side length of 1-8 cm;
   (3) preparing an outer-layer material including mixing persulfate, cement, sand and water uniformly in a mass ratio of 1:(2-3):(1.2-1.5):(0.8-1.2); and
   (4) embedding the inner-layer structure into the centre of an outer-layer mould and filling in the outer-layer mould with the outer-layer material prepared in step (3) to obtain a structure, wherein the structure obtained is a cube with a side length of 2-10 cm, and the structure obtained is further solidified for 1-2 days.

* * * * *